June 16, 1931.  J. O. HORTON  1,810,245
SAWING MACHINE
Filed Dec. 18, 1930   3 Sheets-Sheet 1
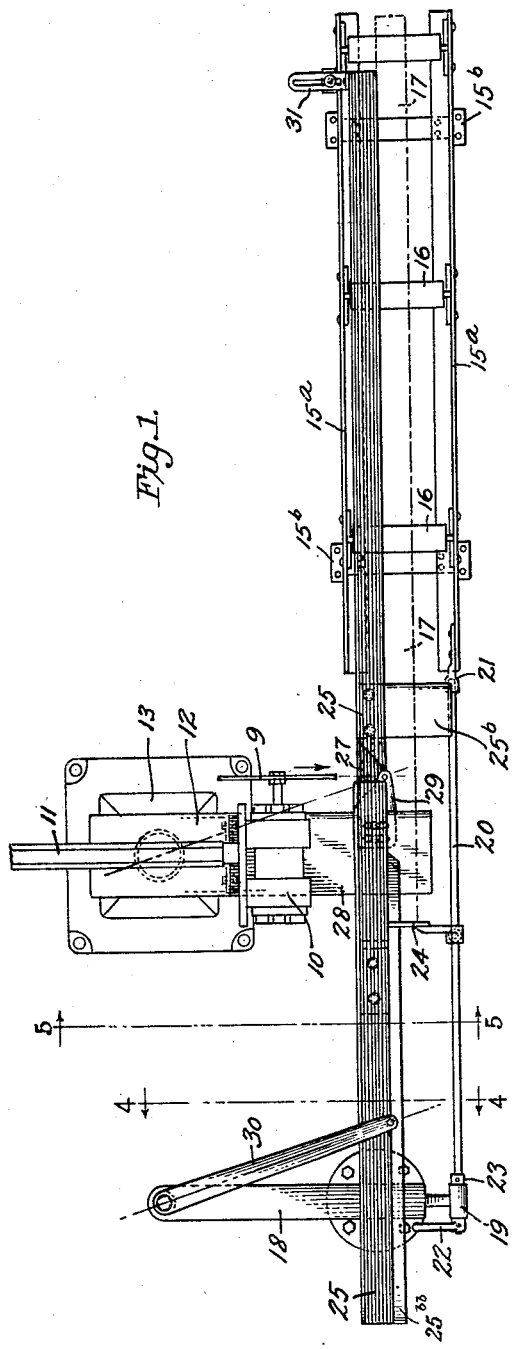
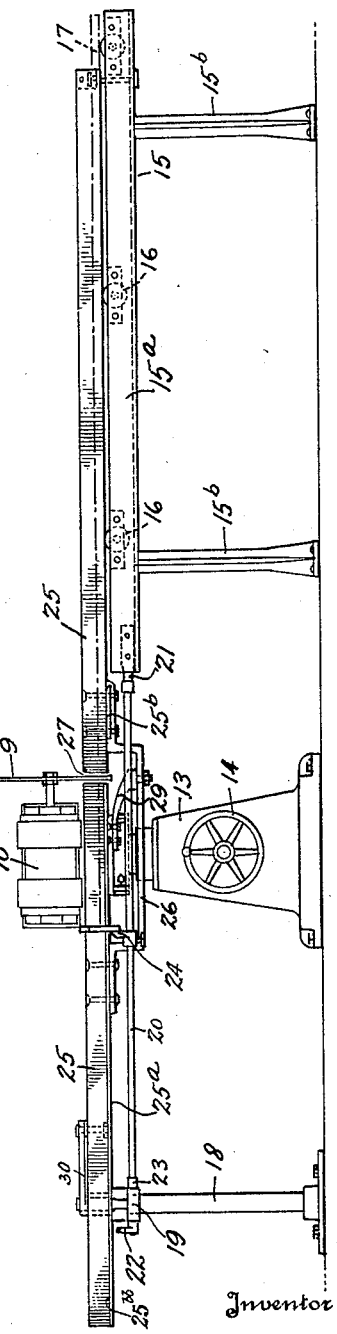
Inventor
John O. Horton
By Dowell and Dowell
his Attorneys June 16, 1931.  J. O. HORTON  1,810,245
SAWING MACHINE
Filed Dec. 18, 1930  3 Sheets-Sheet 2
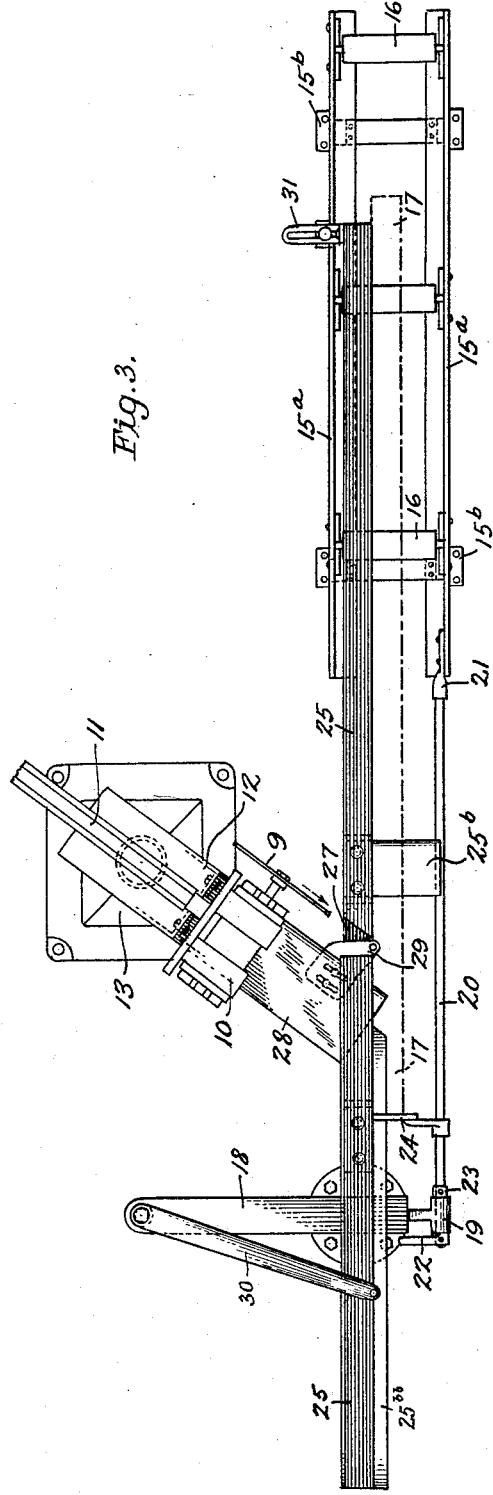
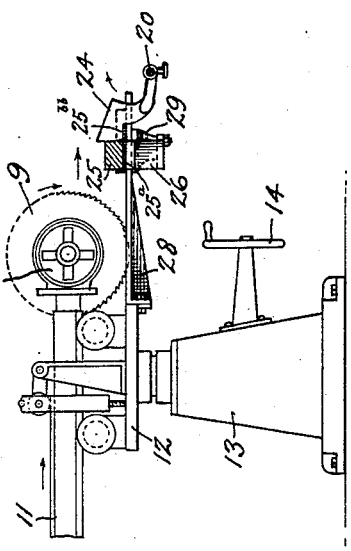
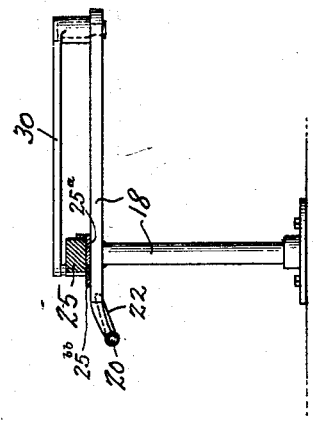
Inventor
John O. Horton
By Dowell and Dowell
his Attorneys

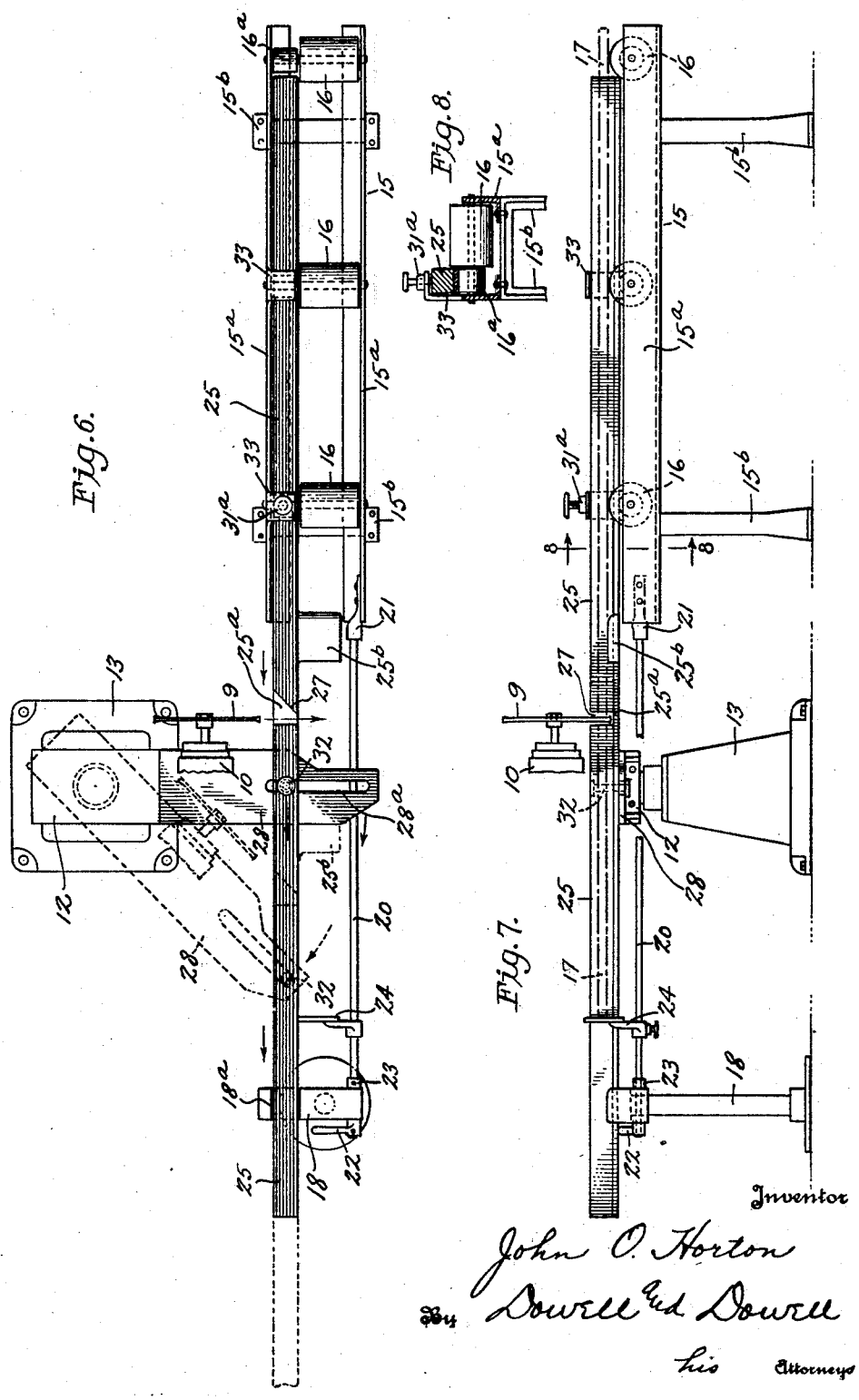

Patented June 16, 1931

1,810,245

UNITED STATES PATENT OFFICE

JOHN O. HORTON, OF MONTROSE, PENNSYLVANIA, ASSIGNOR TO BEACH MANUFACTURING COMPANY, OF MONTROSE, PENNSYLVANIA, A CORPORATION OF PENNSYLVANIA

SAWING MACHINE

Application filed December 18, 1930. Serial No. 503,288.

This invention relates to sawing machines and aims to provide an improvement in those of the type wherein the cutter is reciprocated cross-wise of the work support.

It will be best understood by description with reference to the attached drawings illustrating two practicable embodiments in an organization of separable work-table and cutter unit.

In said drawings:

Fig. 1 is a plan view of the machine with applied improvement in one form;

Fig. 2 is a front elevation thereof;

Fig. 3 is a plan view of the same machine with the cutter swung at a different angle;

Fig. 4 is a sectional end view on the line 4—4 of Fig. 1;

Fig. 5 is a side elevation of the cutter unit taken on the sectional line 5—5 of Fig. 1;

Fig. 6 is a plan view of the machine with applied improvement in another or modified form, parts being broken away;

Fig. 7 is a front elevation of the latter, also with parts broken away; and

Fig. 8 is a section on the line 8—8 of Fig. 7.

The illustrative machine embodies a cutter or saw unit of the character generally known as a "rotary cross-cutter", the same being preferably of the form shown and described in my copending application Serial No. 459,355, filed June 5, 1930, for sawing machines.

This unit comprises a rotary saw 9 on the rotor shaft of an electric motor 10 carried by a recriprocable member 11, which latter is cradled upon a support 12 with swivel-mounting in a pedestal 13 and adapted by means of hand-wheel 14 to be raised and lowered to desired level, as also to be locked in any position of swing about its swivel. The means for actuating said reciprocable member and locking the unit in adjusted position are not here shown, as these are details incidental or collateral to the present invention, and the foregoing brief description will suffice for clear understanding of the cutter operation in conjunction with other parts of the complete machine.

The cutter unit is fastened to the floor beside the extended axis of an elongated table 15, with its saw carriage swingable laterally to said axis, or in some cases to the table itself. This table is shown in skeleton form comprising parallel angle-iron beams 15ª mounted on legs 15ᵇ fastened to the floor. These beams advantageously provide journalment for a series of rollers 16 over which the work, such as a board 17 indicated in dotted lines, is easily advanced into cutting relation to the saw.

Beyond the end of the table is a stand 18 of inverted L-shape also fastened to the floor, the horizontal portion of which carries a sleeve bracket 19 at one end. Through this sleeve one end of a bar 20 extends from a socket-member 21 on one of the beams of the table. A handle 22 on the outer end of this rod provides means for rocking the same in its opposite end supports, while a collar 23 bearing against the sleeve bracket on the opposite side prevents longitudinal movement of said bar. The bar however may obviously have some other means or manner of support, such for example as hereinafter decribed with reference to another member, in relation to which its function is served. This bar carries a slidably adjustable stop-plate 24, which is thereby swung into and out of the feed path of the work, as indicated in Fig. 5, and serves to gauge the length of the cuts according to its position on the rod.

Extending longitudinally of the work-supporting table in projection to and beyond the stand 18 is a guide-member or gauge rail 25. This guide which has an intermediate support (described presently) clears or else rests lightly at one end upon the rollers of the table and is supported at the other end upon the horizontal portion of said stand. It is advantageously provided with a metal heel plate or bottom strip 25ª to save wear. In addition to or as a part of this bottom plate, the guide bar carries a rest-plate 25ᵇ level with the rollers of the table, and a rest-shelf 25ᵇᵇ likewise level with said rollers, which serve as auxiliary supports for the work during cutting operation, especially when a substantial portion or length of the work is projected beyond the farthermost roller of the table as in the case where long cuts are to be made.

In the form of Figs. 1 to 5 inclusive, the guide-bar is formed in two parts connected by a yoke or saddle member 26 at the underside, which provides its intermediate support. A space or gap 27 is provided between the two parts of said bar sufficient to allow passage of the saw or cutter-blade therethrough at different angles, and the bar is accordingly arranged with said space or gap centered directly opposite the saw 9 when the latter is swung on its carriage at right angular disposition to the table axis, as shown in Fig. 1. This assures clear passage for the saw in reciprocate movement with its carrier to opposite sides of the guide-bar, which serves not only to guide the work along the table, but also to steady it on both sides of the saw's cutting path crosswise of the table. It will be noted that the lower edge of the saw lies below the bottom surface of the work (see Fig. 2) and above the top surface of the connection between the two parts of the guide-bar. Accordingly, as the rotating saw is reciprocated in the line of cut for which it is set, the work or boards of lumber need only be advanced longitudinally with each stroke of the saw, which will cut it into lengths according to the adjustment of the stop-plate 24.

In order to have said space of the guide-bar always in the path of movement of the saw when the latter is swung to different angular dispositions to the table, a special connection is made between said bar and saw carriage mounting. This is effected by affixing an extension 28 to the support 12 shown underlying the guide-bar and providing a still further rest for the work as it is fed to the saw. Said extension is pivotally connected with the guide-bar in this instance by a link or lever-plate 29 bolted to the underside of the former and having a pivot stud or pin extending through and headed under the yoke or saddle member which connects the two parts of the guard-bar together and so serves to support it intermediately. This pivotal connection is advantageously located in the line of the saw and preferably in line with the front edge of the guide-bar, so as in effect (with said extension 28) to provide a bell-crank lever connection between the guide-bar and the swivel axis of the saw-carriage support. The distance between the axes of said swivel mounting and said pivotal connection will accordingly equal that of the hypotenuse of a triangle having its longer side at right angles to the table, so that when the saw is disposed on its carriage at right angles to the table, a straight line intersecting these two axes would be angular to the table, as represented in Fig. 1.

Corresponding with this linkage, another is provided at the outer end of the guide-bar, this latter comprising a swing-arm 30 pivotally connected between said guide-bar and the outer end of the L-shaped stand 18 on a line parallel with the aforesaid line intersecting the axes of the aforesaid swivel mounting and pivot of the first described connection, the distance between such connections being of course the same.

Thus by the two angular or swing-arm pivotal connections, the guide-bar will be caused to shift longitudinally with its aforesaid space always in the path of the saw, when and as the latter is swung with its carriage to different angular dispositions to the table, without changing and therefore maintaining the guide-bar's predetermined parallel relation to the table. Regardless therefore of the extent of the saw-carriage swing, the guide-bar will be shifted with the passage space for the saw in the latter's different paths of movement, as illustrated in Fig. 3.

In this connection, referring again to the bar 20, it may be desirable to support the same from this guide-bar so as to shift or move therewith in fixed relation, rather than have it supported as previously described which in many cases would require a separate shifting of the stop-plate (24) thereon every time the saw is swung to a different angle. Such support could obviously be provided simply by opposite end brackets or arms extending laterally from the guide-bar in lieu of the bracket 19 and socket 21 shown in the illustrative construction.

In the different positions or angular dispositions to the table at which the saw is thus swung and adjusted for cutting action crosswise of the table, the guide-bar may be held down firmly by a clamp 31 provided for the purpose on one of the beams of the work-table, along which it should be adjustable to follow the guide-bar to opposite extremes of movement.

The advantages of the described improvement in cutting or sawing machines of this character will be obvious. It provides an organization and construction for high-speed performance and maintains the parts always in cooperative relation and eliminates the necessity of separate adjustment of the guide-bar for each resetting of the saw, while it maintains said bar always in the same relation to the table, so that adjustments for cutting at different angles need be made only with the saw. The high-speed operation and reciprocation of the saw moreover effects a quick cutting action, so that the work may be cut to the different lengths and angles desired, almost as fast as it can be fed to the saw.

In the possible modification illustrated by Figs. 6 to 8 inclusive, the second linkage or swing-arm connection 30 is eliminated and the guide-bar moves always in the same line. In this modification, the extension 28 of the saw carriage support is shown connected directly with the guide-bar by a pin 32 moving in a slot 28ª, while the under-surface plate or strip 25ª serves to connect the two parts of the guide-bar in place of the yoke or saddle 26. The guide-bar moves on small rollers or portions 16ª of the main rollers 16, which latter accordingly serve as guides at one side, while brackets 33 may serve as guides at the other side. One of these brackets may carry a clamp 31ª therefor, as shown in Fig. 8. The projected end of the guide-bar resting on the horizontal portion of the stand 18 moves in a guiding slideway 18ª. Thus the guide-bar with its space 27 is in this instance adapted to slide longitudinally always on the same line as the saw carriage is swung on its swivel, as indicated by the dotted lines in Fig. 6. Moreover, the swing movement and shift may be in either direction from the saw's perpendicular to the table. This different arrangement or features thereof may be desirable in some cases instead of the first described form.

It will be understood that various modifications or changes in the form, construction and arrangement of the parts in different combinations and sub-combinations may be made within the scope of this invention, and it is therefore not intended to limit the same by the appended claims to the specific constructions or forms herein shown.

Having thus described my invention, what I claim as new and desire to secure by Letters Patent of the United States is:

1. In a cutting apparatus, a cutter support comprising an angularly adjustable member upon which a cutter is reciprocated, a work-support traversed by the cutter in its travel and a guide-element for the work resting upon the work-support and movable longitudinally thereon and so engaged by said adjustable member as to travel on said support as the angle of the member changes; said guide-element having an opening through which the cutter may travel and which is thus kept always in registry with the path of cutter travel.

2. In a cutting machine, a cutter support embodying an angularly adjustable member upon which a cutter is reciprocated, a work-support traversed by the cutter in reciprocation at the angular adjustment thereto, and a guide-member for the work resting upon the work-support and having an opening therein for travel of the cutter therethrough; said guide-element being so connected with the adjustable member as to move longitudinally on the work-support as the angle of said member changes and thereby keep said opening always in registry with the path of cutter travel.

3. In a cutting machine, a cutter support embodying an angularly adjustable member upon which a cutter is reciprocated, two or more spaced work-supports whose work level axis is traversed by the cutter in its travel, and a guide-member for the work resting upon the work-supports and movable longitudinally thereon and so engaged by said adjustable member as to travel along said supports as the angle of the member changes; said guide-member having an opening through which the cutter may travel and which is thus kept always in registry with the path of cutter travel.

4. In a cutting machine, a cutter having reciprocable carriage support on a member turnable upon a vertical axis, a horizontal work-support traversed cross-wise by the cutter at any angular setting of its support member thereto, and a guide or gauge-bar for the work resting upon the work-support and having connection with the cutter support member by which it is moved longitudinally with change of the latter's angle to said work-support so as to keep an opening therein always in registry with the travel path of the cutter reciprocated therethrough.

5. In a cutting machine, a work-support, a cutter carriage-support member adjustable angularly thereto for disposing the cutter at variable angle of reciprocation thereacross, a work guide-bar resting on the work-support and having an opening therein through which the cutter may pass in cutting action, and parallel link connections of which said support-member forms one for moving the guide-bar longitudinally along the work-support with its said opening always in registry with the path of cutter travel as the support-member is adjusted to different angles to the work-support.

6. In a cutting machine, a work-supporting table, a cutter mounted for reciprocation cross-wise of the table on a support adjustable angularly thereto at its side, a work guide-bar extending longitudinally of the table and having an opening therein through which the cutter may pass in reciprocated action, and parallel link connections of which the cutter-support forms one for moving the guide-bar endwise on the work-support in maintained longitudinal relation thereto and with its said opening always in registry with the travel path of the cutter as the cutter support is adjusted to different angular positions.

7. In a cutting machine, a work-support, a cutter-support member adjustable angularly thereto upon which a cutter is reciprocated cross-wise thereof, a guide-bar for the work resting upon the work supporting surface and having an opening through which the cutter may pass in reciprocated action, and a connection between said bar and the cutter-support by which the former is moved longitudinally along the work-support in unchanged relation thereto and with its opening always in registry with the travel path of the cutter as said cutter-support is adjusted to different angular positions.

8. In a cutting machine, a work-support, a cutter-support member adjustable angularly thereto upon which a cutter is reciprocated cross-wise thereof, a guide-bar for the work resting upon the work supporting surface and having an opening through which the cutter may pass in reciprocated action, and parallel link connections with said bar of which the cutter support itself forms one for moving the bar endwise along the work-support as the angular position of said cutter-support is changed so as to keep the opening in the bar always in registry with the travel path of the cutter without changing its relation to said work-support.

9. In a cutting machine, a work-supporting table; a rotary cutter carried by a reciprocable member mounted on a support lateral to the table and adjustable angularly thereto for swinging the cutter into various angular lines of cut cross-wise of the table; a guide-bar resting on the table in longitudinal relation thereto for guiding and steadying the work advanced therealong in cutting relation to the cutter and having a gap-space therein through which the cutter may pass in reciprocate action; and parallel link connections with said guide-bar of which the cutter carriage itself forms one for shifting the bar with its gap-space always in the travel path of the cutter as the latter is swung to different angular positions, while maintaining the bar always in the same relation to the table.

In testimony whereof I affix my signature.

JOHN O. HORTON.